(12) United States Patent
Wang et al.

(10) Patent No.: US 11,093,806 B2
(45) Date of Patent: *Aug. 17, 2021

| | | |
|---|---|---|
| (54) | RECOGNITION METHOD AND DEVICE FOR A TARGET PERCEPTION DATA | |
| (71) | Applicant: | Huawei Technologies Co., Ltd., Shenzhen (CN) |
| (72) | Inventors: | Liangwei Wang, Shenzhen (CN); Jia Chen, Shenzhen (CN) |
| (73) | Assignee: | HUAWEI TECHNOLOGIES CO., LTD., Shenzhen (CN) |
| ( * ) | Notice: | Subject to any disclaimer, the term of this patent is extended or adjusted under 35 U.S.C. 154(b) by 0 days. This patent is subject to a terminal disclaimer. |
| (21) | Appl. No.: | 16/586,209 |
| (22) | Filed: | Sep. 27, 2019 |
| (65) | | Prior Publication Data |
| | US 2020/0097779 A1 | Mar. 26, 2020 |
| | | Related U.S. Application Data |
| (63) | Continuation of application No. 15/460,339, filed on Mar. 16, 2017, now Pat. No. 10,452,962, which is a (Continued) | |
| (30) | | Foreign Application Priority Data |
| | Sep. 16, 2014 (CN) ......... 201410471480.X | |
| (51) | Int. Cl. | |
| | *G06K 9/62* | (2006.01) |
| | *G06K 9/66* | (2006.01) |
| | (Continued) | |
| (52) | U.S. Cl. | |
| | CPC ........ *G06K 9/66* (2013.01); *G06K 9/00624* (2013.01); *G06K 9/00718* (2013.01); (Continued) | |

(58) Field of Classification Search
None
See application file for complete search history.

(56) References Cited

U.S. PATENT DOCUMENTS 8,694,522 B1    4/2014 Pance
2011/0294483 A1  12/2011 Sathish
(Continued)

FOREIGN PATENT DOCUMENTS

CN    102880879 A    1/2013
CN    102884822 A    1/2013
(Continued)

OTHER PUBLICATIONS

Machine Translation and Abstract of Chinese Publication No. CN102880879, dated Jan. 16, 2013, 14 pages.
(Continued)

*Primary Examiner* — Idowu O Osifade
(74) *Attorney, Agent, or Firm* — Conley Rose, P.C.

(57) ABSTRACT

A data processing method and device, where the method includes obtaining target perception data, where the target perception data is any type of the following data, such as image data, video data, or voice data, determining a target scenario to which the target perception data belongs, determining a target perception model corresponding to the target scenario, and computing a recognition result of the target perception data according to the target perception model. According to the data processing method and device, a scenario to which perception data belongs is determined, and a recognition result of the perception data is obtained through computation using a perception model corresponding to the scenario.

24 Claims, 6 Drawing Sheets

Related U.S. Application Data continuation of application No. PCT/CN2015/088832, filed on Sep. 2, 2015.

(51) Int. Cl.
*G06K 9/00* (2006.01)
*G10L 15/06* (2013.01)

(52) U.S. Cl.
CPC .......... *G06K 9/6228* (2013.01); *G10L 15/063* (2013.01); *G06K 2209/21* (2013.01)

(56) References Cited

U.S. PATENT DOCUMENTS

| | | | |
|---|---|---|---|
| 2012/0232993 | A1* | 9/2012 | Caiman ................ G06Q 30/02 705/14.58 |
| 2013/0132566 | A1 | 5/2013 | Olsen et al. |
| 2014/0207873 | A1 | 7/2014 | Rao et al. |
| 2014/0211067 | A1 | 7/2014 | Penov et al. |
| 2016/0019239 | A1* | 1/2016 | Bastaldo-Tsampalis ..................... G06F 17/30256 345/632 |

FOREIGN PATENT DOCUMENTS

| | | |
|---|---|---|
| CN | 102918821 A | 2/2013 |
| CN | 103035135 A | 4/2013 |
| CN | 103593643 A | 2/2014 |
| CN | 103942573 A | 7/2014 |
| CN | 103942673 A | 7/2014 |
| WO | 2013093173 A1 | 6/2013 |

OTHER PUBLICATIONS

Machine Translation and Abstract of Chinese Publication No. CN103942573, dated Jul. 23, 2014, 10 pages.
Machine Translation and Abstract of Chinese Publication No. CN103593643, dated Feb. 19, 2014, 13 pages.
Machine Translation and Abstract of Chinese Publication No. CN103942673, dated Jul. 23, 2014, 9 pages.
Jia, Y., et al., "Caffe: Convolutional Architecture for Fast Feature Embedding," Computer Vision and Pattern Recognition, Jan. 20, 2014, 4 pages.
Xiao, J., et al., "SUN Database: Large-scale Scene Recognition from Abbey to Zoo," IEEE Conference on Computer Vision and Pattern Recognition, Jun. 13-18, 2010, pp. 3485-3492.
Gomes, J., et al., "Where will you go? Mobile Data Mining for Next Place Prediction," Proceedings of the 15th International Conference on Data Warehousing and Knowledge Discovery, vol. 8057, Aug. 26-29, 2013, 12 pages.
Murphy, K., et al., "Object Detection and Localization using Local and Global Features," XP019053229, Toward Category-Level Object Recognition, LNCS 4170, 2006, pp. 382-400.
Torralba, A., et al., "Context-based vision system for place and object recognition," XP055396635, Proceedings of the Eight IEEE International Conference on Computer Vision, Oct. 13-16, 2003, 44 pages.
Murphy, K., et al., "Using the Forest to See the Trees: A Graphical Model Relating Features, Objects, and Scene," XP055397413, Neural Information Processing Systems, 2003, 8 pages.
Torralba, A., et al., "Using the forest to see the trees: exploiting context for visual object detection and localization," XP058248011, Neural Information Processing Systems, vol. 53, No. 3, 2008, 9 pages.
Foreign Communication From a Counterpart Application, PCT Application No. PCT/CN2015/088832, English Translation of International Search Report dated Nov. 13, 2015, 2 pages.
Foreign Communication From a Counterpart Application, European Application No. 15842270.9, Extended European Search Report dated Aug. 18, 2017, 12 pages.
Foreign Communication From a Counterpart Application, Chinese Application No. 103035135, dated Apr. 10, 2013, 16 pages.
Foreign Communication From a Counterpart Application, Chinese Application No. 201410471480.X, Chinese Search Report dated Jun. 5, 2018, 2 pages.
Foreign Communication From a Counterpart Application, Chinese Application No. 201410471480.X, Chinese Office Action dated Jun. 13, 2018, 5 pages.
Foreign Communication From a Counterpart Application, European Application No. 15842270.9, European Search Report dated Jul. 24, 2018, 6 pages.
Foreign Communication From a Counterpart Application, Chinese Application No. 201410471480.X, Chinese Office Action dated Apr. 10, 2019, 6 pages.

\* cited by examiner

RECOGNITION METHOD AND DEVICE FOR A TARGET PERCEPTION DATA

CROSS-REFERENCE TO RELATED APPLICATIONS

This application is a continuation of U.S. patent application Ser. No. 15/460,339, filed on Mar. 16, 2017, which is a continuation of International Application No. PCT/CN2015/088832, filed on Sep. 2, 2015, which claims priority to Chinese Patent Application No. 201410471480.X, filed on Sep. 16, 2014. All of the afore-mentioned patent applications are hereby incorporated by reference in their entireties.

TECHNICAL FIELD

Embodiments of the present disclosure relate to the data processing field, and in particular, to a data processing method and device.

BACKGROUND

Terminal devices such as a mobile phone, a wearable device, and a robot all need to recognize multiple types of objects, voices, and actions from perception data such as an image, a video, and a voice. For example, to perform searching by means of photo taking, a mobile phone needs to first recognize a target object in a taken photo, and then can search for information related to the target object. For another example, to perform a task of grabbing a target object, a robot needs to first obtain a location of the target object in an ambient environment using camera data.

A general method for equipping a terminal device with extensive recognition capabilities is to train, with massive known sample data, a perception model that can distinguish between various objects, voices, or actions. The terminal device may obtain, through computation based on the trained perception model, a corresponding recognition result for a new image, a video, or a voice in each input.

As types that need to be recognized increase, to improve recognition accuracy, a perception model used to recognize perception data becomes increasingly complex. For example, a perception model has a growing quantity of parameters. For example, currently, a convolutional neural network (CNN) model used for image recognition already has tens of millions of or even hundreds of millions of parameters. Currently, to improve user experience, a perception model in many applications needs to precisely recognize a large quantity of objects, actions, or voices in various given scenarios. This poses a great challenge to accuracy of the perception model. In some approaches, a perception model with fixed parameters is usually used to complete all recognition tasks, and therefore, complexity of the perception model infinitely increases with refinement of a recognition requirement, which poses a great challenge to storage and computation.

SUMMARY

Embodiments of the present disclosure provide a data processing method and device that can resolve a problem of a contradiction between a computation capability of a device and complexity of a perception model.

A first aspect provides a data processing method, where the method includes obtaining target perception data, where the target perception data is any type of the following data, image data, video data, or voice data, determining a target scenario to which the target perception data belongs, determining a target perception model corresponding to the target scenario, and computing a recognition result of the target perception data according to the target perception model.

With reference to the first aspect, in a first possible implementation manner of the first aspect, determining a target scenario to which the target perception data belongs includes performing scenario analysis on the target perception data, and determining the target scenario.

With reference to the first possible implementation manner of the first aspect, in a second possible implementation manner of the first aspect, the target perception data is data generated at a location at which a terminal is currently located, and the performing scenario analysis on the target perception data, and determining the target scenario includes performing scenario analysis on the target perception data according to positioning information of the location at which the terminal is currently located, and determining the target scenario.

With reference to the first aspect, in a third possible implementation manner of the first aspect, determining a target scenario to which the target perception data belongs includes sending, to a server, a first request used to request a scenario to which the target perception data belongs, and receiving the target scenario that is sent by the server according to the first request.

With reference to any one of the first aspect, or the first to the third possible implementation manners of the first aspect, in a fourth possible implementation manner of the first aspect, the determining a target perception model corresponding to the target scenario includes determining, from a pre-stored perception model library, the target perception model corresponding to the target scenario, where each perception model in the perception model library corresponds to a scenario.

With reference to the fourth possible implementation manner of the first aspect, in a fifth possible implementation manner of the first aspect, the method further includes updating the perception model library according to a historical scenario sequence of a user, where the updated perception model library includes the target perception model corresponding to the target scenario.

With reference to any one of the first aspect, or the first to the third possible implementation manners of the first aspect, in a sixth possible implementation manner of the first aspect, determining a target perception model corresponding to the target scenario includes sending, to a server, a second request used to request the perception model corresponding to the target scenario when a pre-stored perception model library has no perception model corresponding to the target scenario, where each perception model in the perception model library corresponds to a scenario, and receiving the target perception model that corresponds to the target scenario and sent by the server according to the second request.

A second aspect provides a data processing method, where the method includes receiving a request message that is sent by a terminal and used to request a perception model corresponding to a scenario to which target perception data belongs, where the target perception data is any type of the following data, image data, video data, or voice data, determining, according to the request message, a target scenario to which the target perception data belongs, determining, from a pre-stored perception model library, a target perception model corresponding to the target scenario, where each model in the perception model library corresponds to a scenario, and sending the target perception model to the terminal according to the request message such that the terminal computes a recognition result of the target perception data according to the target perception model.

With reference to the second aspect, in a first possible implementation manner of the second aspect, before receiving a request message, the method further includes obtaining a perception data sample, where the perception data sample includes at least a part of perception data that has scenario annotation information and object annotation information, training, according to the perception data sample, perception models respectively corresponding to different scenarios, and storing, in the perception model library, the perception models respectively corresponding to the different scenarios, where the perception model library includes the target perception model.

With reference to the second aspect or the first possible implementation manner of the second aspect, in a second possible implementation manner of the second aspect, determining, according to the request message, a target scenario to which the target perception data belongs includes performing scenario analysis on the target perception data included in the request message, and determining the target scenario to which the target perception data belongs.

With reference to the second possible implementation manner of the second aspect, in a third possible implementation manner of the second aspect, the target perception data is data generated at a location at which the terminal is currently located, and determining a target scenario to which the target perception data belongs includes performing scenario analysis on the target perception data according to positioning information of the location at which the terminal is currently located, and determining the target scenario.

With reference to the second aspect or the first possible implementation manner of the second aspect, in a fourth possible implementation manner of the second aspect, determining, according to the request message, a target scenario to which the target perception data belongs includes determining the target scenario according to an identifier that is included in the request message and used to indicate the target scenario.

A third aspect provides a data processing device, where the device includes an obtaining module configured to obtain target perception data, where the target perception data is any type of the following data, image data, video data, or voice data, a first determining module configured to determine a target scenario to which the target perception data obtained by the obtaining module belongs, a second determining module configured to determine a target perception model corresponding to the target scenario determined by the first determining module, and a computation module configured to compute, according to the target perception model determined by the second determining module, a recognition result of the target perception data obtained by the obtaining module.

With reference to the third aspect, in a first possible implementation manner of the third aspect, the first determining module is further configured to perform scenario analysis on the target perception data, and determine the target scenario.

With reference to the first possible implementation manner of the third aspect, in a second possible implementation manner of the third aspect, the target perception data is data generated at a location at which a terminal is currently located, and the first determining module is further configured to perform scenario analysis on the target perception data according to positioning information of the location at which the terminal is currently located, and determine the target scenario.

With reference to the third aspect, in a third possible implementation manner of the third aspect, the first determining module includes a first sending unit configured to send, to a server, a first request used to request a scenario to which the target perception data belongs, and a first receiving unit configured to receive the target scenario that is sent by the server according to the first request.

With reference to any one of the third aspect, or the first to the third possible implementation manners of the third aspect, in a fourth possible implementation manner of the third aspect, the second determining module is further configured to determine, from a pre-stored perception model library, the target perception model corresponding to the target scenario, where each perception model in the perception model library corresponds to a scenario.

With reference to the fourth possible implementation manner of the third aspect, in a fifth possible implementation manner of the third aspect, the device further includes an updating module configured to update the perception model library according to a historical scenario sequence of a user before the obtaining module obtains the target perception data, where the updated perception model library includes the target perception model corresponding to the target scenario.

With reference to any one of the third aspect, or the first to the third possible implementation manners of the third aspect, in a sixth possible implementation manner of the third aspect, the second determining module includes a second sending unit configured to send, to a server, a second request used to request the perception model corresponding to the target scenario when a pre-stored perception model library has no perception model corresponding to the target scenario, where each perception model in the perception model library corresponds to a scenario, and a second receiving unit configured to receive the target perception model that corresponds to the target scenario and sent by the server according to the second request.

A fourth aspect provides a data processing device, where the device includes a receiving module configured to receive a request message that is sent by a terminal and used to request a perception model corresponding to a scenario to which target perception data belongs, where the target perception data is any type of the following data, image data, video data, or voice data, a first determining module configured to determine, according to the request message received by the receiving module, a target scenario to which the target perception data belongs, a second determining module configured to determine, from a pre-stored perception model library, the target perception model corresponding to the target scenario determined by the first determining module, where each model in the perception model library corresponds to a scenario, and a sending module configured to send, to the terminal according to the request message received by the receiving module, the target perception model determined by the second determining module such that the terminal computes a recognition result of the target perception data according to the target perception model.

With reference to the fourth aspect, in a first possible implementation manner of the fourth aspect, the device further includes an obtaining module configured to obtain a perception data sample before the receiving module receives the request message, where the perception data sample includes at least a part of perception data that has scenario annotation information and object annotation information, a training module configured to train, according to the perception data sample, perception models respectively corresponding to different scenarios, and a storage module configured to store, in the perception model library, the perception models that are respectively corresponding to the different scenarios and obtained through training by the training module, where the perception model library includes the target perception model.

With reference to the fourth aspect or the first possible implementation manner of the fourth aspect, in a second possible implementation manner of the fourth aspect, the first determining module is further configured to perform scenario analysis on the target perception data included in the request message, and determine the target scenario to which the target perception data belongs.

With reference to the second possible implementation manner of the fourth aspect, in a third possible implementation manner of the fourth aspect, the target perception data is data generated at a location at which the terminal is currently located, and the first determining module is further configured to perform scenario analysis on the target perception data according to positioning information of the location at which the terminal is currently located, and determine the target scenario.

With reference to the fourth aspect or the first possible implementation manner of the fourth aspect, in a fourth possible implementation manner of the fourth aspect, the first determining module is further configured to determine the target scenario according to an identifier that is included in the request message and used to indicate the target scenario.

Based on the foregoing technical solutions, according to the data processing method and device in the embodiments of the present disclosure, a scenario to which perception data belongs is determined, and a recognition result of the perception data is obtained through computation using a perception model corresponding to the scenario, which can reduce computation complexity and therefore can improve data processing efficiency in comparison with the other approaches.

BRIEF DESCRIPTION OF DRAWINGS

To describe technical solutions in embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
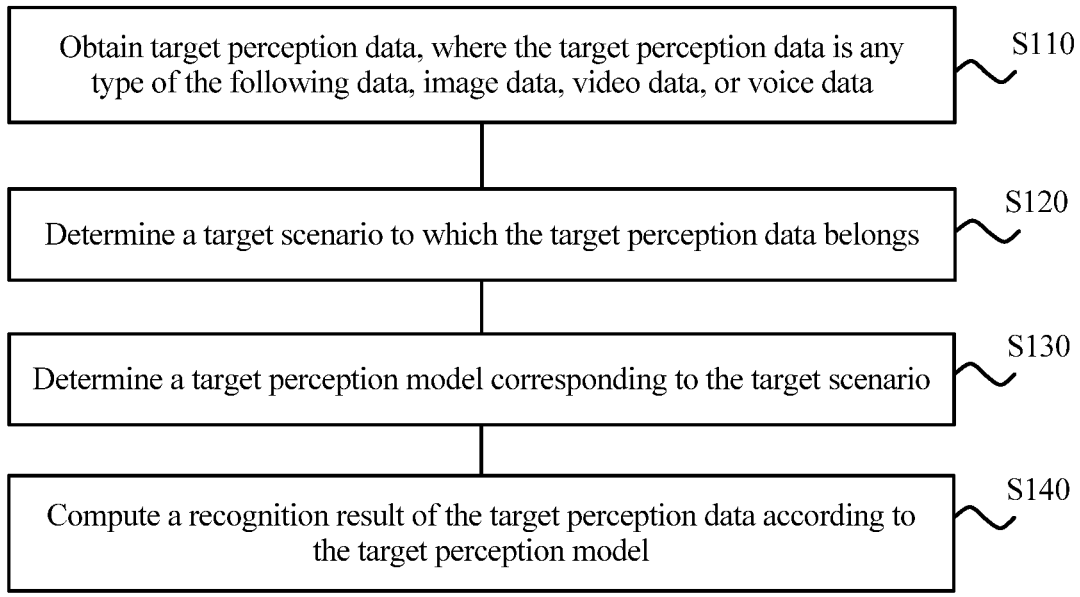
FIG. 1 shows a schematic flowchart of a data processing method according to an embodiment of the present disclosure.

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that, the technical solutions of the embodiments of the present disclosure may be applied to various communications systems such as a Universal Mobile Telecommunications System (UMTS), a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, LTE time division duplex (TDD), and a Worldwide Interoperability for Microwave Access (WiMAX) communications system.

It should be further understood that in the embodiments of the present disclosure, a terminal may also be referred to as user equipment (UE), a mobile station (MS), a mobile terminal, or the like. The terminal may communicate with one or more core networks using a radio access network (RAN). For example, the terminal may be a mobile phone (or referred to as a "cellular" phone) or a computer with a mobile terminal. For example, the terminal may be further a portable, pocket-sized, handheld, or in-vehicle mobile apparatus, or a mobile apparatus built in a computer. The mobile apparatus exchanges voice and/or data with the radio access network. Further, the terminal may be a mobile phone, a wearable device, a robot, or the like.

In other approaches, one perception model with fixed parameters is generally used to complete all recognition tasks. For example, recognition tasks are performed, using a same perception model, on perception data generated in a supermarket, a hospital, or a kitchen. As types of objects that need to be recognized increase and a requirement for recognition accuracy becomes increasingly high, a perception model has a growing quantity of parameters. For example, currently, a CNN model used to recognize tens of thousands of objects in images already has tens of millions of or even hundreds of millions of parameters. This inevitably greatly increases computation complexity of the perception model, and also poses a challenge to storage space of the perception model.

In view of the foregoing existing problem, the present disclosure provides a data processing method. In a perception model training process, a factor of scenario is considered, and perception models respectively for different scenarios are generated. In a recognition computation process of perception data, a scenario to which the perception data belongs is first determined, then a perception model corresponding to the scenario is obtained, and finally, a recognition result of the perception data is computed using the perception model corresponding to the scenario to which the perception data belongs.

Types of objects that appear in each scenario are limited. For example, in an outdoor scenario or a city scenario, an object such as a person, a vehicle, a building, or a character may need to be recognized, but basically, there is no need for recognizing various animals and plants. In other words, a quantity of types of objects that frequently appear in each scenario and need to be recognized is relatively small. Correspondingly, a perception model corresponding to each scenario has a relatively small quantity of model parameters such that computation complexity of the perception model corresponding to each scenario is greatly reduced, and a requirement for storage space is not very high. Therefore, according to the data processing method proposed in the present disclosure, complexity and a computation workload of a perception model can be greatly reduced while data recognition accuracy is maintained or even improved, which resolves a contradiction between a terminal computation capability and model complexity in order to effectively improve a recognition capability.

To help a person skilled in the art better understand the technical solutions of the present disclosure, the following uses a specific example to describe a specific application scenario of the embodiments of the present disclosure. For example, when a user takes a photo in a piazza, a mobile phone may be used to recognize an object such as a flowerbed, a cafe, or a bus according to the photo. For another example, when a user takes a photo in the woods, a mobile phone may be used to recognize an object such as clover, a chrysanthemum, or a mantis according to the photo. That is, the technical solutions provided in the embodiments of the present disclosure may be applied to the following scenario in which when a user uses a mobile phone to take photos in various scenarios, the mobile phone recognizes various objects in the photos and replies with names of the objects. It should be understood that the foregoing mobile phone may be another terminal device.

FIG. 1 shows a data processing method 100 according to an embodiment of the present disclosure. The method 100 is performed, for example, by a terminal. As shown in FIG. 1, the method 100 includes the following steps.

Step S110: Obtain target perception data, where the target perception data is any type of the following data, image data, video data, or voice data.

Further, the target perception data may be data measured or generated by a sensing apparatus such as a camera, a microphone, an infrared sensor, or a depth sensor. For example, the target perception data is a picture, a video, or a recording.

It should be understood that the terminal that obtains the target perception data may also be a device that generates the target perception data. Optionally, in this embodiment of the present disclosure, obtaining target perception data in step S110 includes generating the target perception data at a location at which the terminal is currently located.

Further, for example, a user uses a mobile phone to take a photo in scenario A, and directly uses the mobile phone to perform recognition processing on the taken photo.

It should be further understood that the terminal that obtains the target perception data may be a device different from a device that generates the target perception data. For example, a user uses a mobile phone to take a photo (the mobile phone generates perception data), and then uploads the photo to a notebook computer (the notebook computer obtains the perception data for subsequent data processing) for corresponding processing.

Step S120: Determine a target scenario to which the target perception data belongs.

Further, scenario analysis and recognition may be performed on the target perception data to determine the target scenario to which the target perception data belongs. Alternatively, a request for the target scenario to which the target perception data belongs may be sent to a server. This is not limited in this embodiment of the present disclosure.

Optionally, in this embodiment of the present disclosure, determining a target scenario to which the target perception data belongs in step S120 includes performing scenario analysis on the target perception data, and determining the target scenario.

Further, a scenario recognizer may be used to perform scenario analysis on the target perception data in order to determine the target scenario to which the target perception data belongs. The scenario recognizer may be an existing scenario classification model, for example, a support vector machine (SVM) multi-class classifier. Further, for example, the target perception data is data obtained by a camera. A feature such as a global feature (GIST), dense scale-invariant feature transform (Dense SIFT), or a texton histogram (Texton Histograms) of an image is extracted from the camera data. These features are input to a previously trained SVM multi-class classifier. Scenario recognition is performed, and a scenario type is output. For example, it is recognized that a scenario is "a piazza."

Further, when the target perception data is perception data generated at the location at which the terminal is currently located, the scenario to which the target perception data belongs may be further restricted according to positioning information of the location at which the terminal is currently located.

Optionally, in this embodiment of the present disclosure, the target perception data is the data generated at the location at which the terminal is currently located.

In step S120, performing scenario analysis on the target perception data, and determining the target scenario includes performing scenario analysis on the target perception data according to the positioning information of the location at which the terminal is currently located, and determining the target scenario.

Further, for example, the target perception data is a photo taken in a piazza A at which the terminal is currently located. An SVM multi-class classifier performs scenario analysis on the target perception data, and a recognition result of the scenario analysis is that a target scenario to which the target perception data belongs is a piazza. Then, positioning information of the location at which the terminal is currently located (that is, the piazza A) is obtained, and the target scenario to which the target perception data belongs may be further restricted from the piazza to the piazza A according to the positioning information. For another example, the target perception data is a photo taken at a kitchen at which the terminal is currently located. An SVM multi-class classifier performs scenario analysis on the target perception data, and a recognition result of the scenario analysis is that a target scenario to which the target perception data belongs is an indoor scenario. Then, positioning information of the location at which the terminal is currently located (that is, the kitchen) is obtained, and the target scenario to which the target perception data belongs may be further restricted from the indoor scenario to the kitchen according to the positioning information.

It can be learned that, in this embodiment of the present disclosure, the scenario to which the target perception data belongs may be further restricted to a smaller spatial-temporal area according to the positioning information of the terminal. It should be understood that a perception model corresponding to a more specific scenario with a relatively small range is correspondingly more simplified, computation complexity of the perception model is relatively low, and a computation workload of subsequent recognition computation of perception data based on the perception model is also relatively small.

It should be understood that, in this embodiment of the present disclosure, a method for obtaining the positioning information of the location at which the terminal is currently located may be any one of the following methods or a combination of multiple methods, a method of using WI-FI for positioning, and a method of using a simultaneous localization and mapping (SLAM) function for positioning. The method of using WI-FI for positioning is further as follows. The terminal scans and searches for a signal of a surrounding WI-FI wireless access point, to obtain a media access control (MAC) address. Generally, the wireless access point does not move in a specific time period. Therefore, the terminal may report the MAC address to a location server. The location server may retrieve a previously stored geographical location of the wireless access point, obtain, through computation according to signal strength of each wireless access point, a geographical location corresponding to the terminal, and deliver corresponding positioning information to the terminal. In this way, the terminal obtains the positioning information of the location at which the terminal is currently located. The SLAM technology further means that in a moving process of a camera, the camera constructs a map and determines a location of the camera while simultaneously performing repeated observation. Alternatively, another positioning method may be used to obtain the positioning information of the location at which the terminal is currently located, for example, global positioning system (GPS). This is not limited in this embodiment of the present disclosure.

Alternatively, a request for the target scenario to which the target perception data belongs may be sent to the server.

Optionally, in this embodiment of the present disclosure, determining a target scenario to which the target perception data belongs in step S120 includes sending, to the server, a first request used to request a scenario to which the target perception data belongs, and receiving the target scenario that is sent by the server according to the first request.

Further, the first request includes the target perception data, and may further include an identifier of the terminal.

Step S130: Determine a target perception model corresponding to the target scenario.

Further, the target perception model corresponding to the target scenario may be determined according to a perception model library locally pre-stored in the terminal. Alternatively, the target perception model corresponding to the target scenario may be requested from a network-side server. This is not limited in this embodiment of the present disclosure.

Optionally, in this embodiment of the present disclosure, determining a target perception model corresponding to the target scenario in step S130 includes determining, from the pre-stored perception model library, the target perception model corresponding to the target scenario, where each perception model in the perception model library corresponds to a scenario.

Further, the pre-stored perception model library may be understood as a local storage area that is of the terminal and used to cache a perception model. Optionally, each perception model may be stored in the perception model library in a storage form of a scenario identifier (a scenario number, a scenario, or a type)+a perception model, that is, each perception model in the perception model library corresponds to a scenario. For example, when the target scenario to which the target perception data belongs is a scenario D, and the perception model library locally cached in the terminal has a perception model d corresponding to the scenario D, the perception model d that performs recognition processing on the target perception data may be directly obtained from the perception model library.

It should be understood that, each time the terminal receives a perception model delivered by the server, the terminal may cache, in the perception model library for subsequent use, the received perception model and a scenario identifier corresponding to the perception model. Optionally, when storage space of the perception model library is all occupied, an earliest-cached perception model may be deleted, and then a latest received perception model is cached in the perception model library.

The target perception model may be requested from the network-side server when the perception model library locally cached in the terminal has no target perception model corresponding to the target scenario to which the target perception data belongs.

Optionally, in this embodiment of the present disclosure, determining a target perception model corresponding to the target scenario in step S130 includes sending, to a server, a second request used to request the perception model corresponding to the target scenario when the pre-stored perception model library has no perception model corresponding to the target scenario, where each perception model in the perception model library corresponds to a scenario, and receiving the target perception model that corresponds to the target scenario and sent by the server according to the second request.

It should be understood that the second request includes an identifier indicating the target scenario, and may further include the identifier of the terminal.

Optionally, in this embodiment of the present disclosure, the received target perception model corresponding to the target scenario may be cached in the perception model library locally pre-stored in the terminal such that when the target perception model corresponding to the target scenario needs to be obtained for a next time, the terminal may directly obtain the target perception model locally with no need to request the target perception model from the server again.

Step S140: Compute a recognition result of the target perception data according to the target perception model.

Further, for example, the target perception data is image data of a camera, and a target scenario to which the target perception data belongs is a piazza. A corresponding target perception model, for example, <piazza.model>, is loaded from the pre-stored perception model library, and the image data of the camera is analyzed and recognized. A recognition process is as follows, reading the image, generating multiple partial image areas in the original image using a sliding window, inputting the partial area images into a CNN that is configured according to a link weight parameter in the <piazza.model> file, and outputting one to multiple recognition results, for example, <flowerbed, bench, tourist, bus, car, police officer, child, balloon, cafe>.

It should be understood that a computation process in step S140 may be computing a recognition result according to an algorithm model such as a deep neural network (DNN). For example, a computation step is as follows, sequentially performing data block selection, cascade convolution and sampling computation at each layer of the neural network, and classification matrix computation on input perception data, to generate a classification result.

It should be further understood that the computation process in S140 includes but is not limited to the following, being completely performed by a general purpose central processing unit (CPU). For example, if input perception data is image data, the computation process may be partially performed by a graphics processing unit (GPU) chip. For another example, if input perception data is voice data, video data, or the like, the computation process may be partially performed by a corresponding dedicated chip. This is not limited in this embodiment of the present disclosure.

It should be further understood that, in this embodiment of the present disclosure, a recognition result of perception data is obtained through computation using a perception model locally pre-stored in a terminal, which avoids a problem that a server needs to respond to a perception data recognition request from each terminal, and deliver a recognition result of each piece of perception data one by one. Therefore, according to the data processing method in this embodiment of the present disclosure, a computation burden on a network-side server and a bandwidth burden required in data transmission can be effectively reduced, and a speed of recognition computation can be further improved.

Therefore, in the data processing method in this embodiment of the present disclosure, a scenario to which perception data that needs to be recognized belongs is determined, and a recognition result of the perception data is obtained through computation using a perception model corresponding to the scenario, which can reduce computation complexity and then can improve data processing efficiency in comparison with the other approaches.

Optionally, in this embodiment of the present disclosure, before obtaining the target perception data, the method further includes the following steps, which are not shown in FIG. 1.

Step S150: Update the perception model library according to a historical scenario sequence of a user, where the updated perception model library includes the target perception model corresponding to the target scenario.

Specific steps are as follows.

Step S151: Predict, according to the historical scenario sequence of the user, a scenario to which to-be-recognized perception data belongs.

For example, it can be learned according to the perception model library locally pre-stored in the terminal that scenarios and time sequences of the scenarios on a workday of a user S are as follows, 06:00 bedroom, 7:00 living room, 7:20 street, 7:30 highway, and 7:40 garage in a work area. The foregoing scenarios and time sequences of the scenarios are used as an input sequence of a conditional random field (CRF) algorithm model, to obtain, through prediction, a most probable next scenario and a probability of the scenario, for example, office: 0.83, and conference room: 0.14.

Step S152: Request, from a server, a perception model corresponding to the scenario to which the to-be-recognized perception data belongs.

For example, a third request used to request perception models respectively corresponding to an office scenario and a conference room scenario is sent to the server, and the third request includes an identifier used to indicate the office scenario and an identifier indicating the conference room scenario.

Step S153: Receive the perception model that corresponds to the scenario to which the to-be-recognized perception data belongs and sent by the server, and update the locally pre-stored perception model library.

Further, the perception models that are respectively corresponding to the office scenario and the conference room scenario and sent by the server are received, and the perception models corresponding to the two scenarios are stored in the locally pre-stored perception model library in a form of a scenario identifier (a number or a type)+a perception model. In this case, when a scenario to which subsequently obtained perception data belongs is an office, the perception model corresponding to the office may be directly obtained from the locally pre-stored perception model library such that a recognition result of the perception data is obtained according to the updated perception model.

Therefore, in this embodiment of the present disclosure, a recognition result of perception data may be obtained through computation using a perception model that corresponds to each scenario and pre-stored in the terminal, which can effectively improve data processing efficiency.

The following further describes the present disclosure with reference to a specific embodiment. It should be understood that the following embodiment is only intended to help better understand the present disclosure, instead of limiting the present disclosure.

For example, an execution body is a mobile phone, and the target perception data is a photo taken in the piazza A.

(1) The mobile phone obtains the photo, and performs recognition processing on the photo.

(2) Extract a feature, such as a GIST, dense SIFT, or Texton Histograms, from the photo, input these features into a previously trained scenario classification model (an SVM multi-class classifier), perform scenario recognition, and recognize a scenario as a piazza.

(3) Further, obtain positioning information of a location at which the terminal is currently located.

(4) Further restrict the scenario of the photo to the piazza A according to the positioning information.

(5) Determine whether a perception model library locally cached in the terminal has a perception model corresponding to the piazza A, and if the perception model library locally cached in the terminal has the perception model corresponding to the piazza A, go to (6), or if the perception model library locally cached in the terminal has no perception model corresponding to the piazza A, go to (7).

(6) Obtain the perception model corresponding to the piazza A, for example, <piazza.model>, from the perception model library locally cached in the terminal, and go to (9).

(7) Send, to a network-side server, an identifier (ID) of the mobile phone, a request sequence number, and the recognized scenario, that is, an identifier (a number or a type) of the piazza A, to request the perception model of the piazza A.

(8) Receive the perception model that corresponds to the piazza A and sent by the server, for example, <piazza.model>, cache the received model parameter file <piazza.model> in the perception model library in the mobile phone, and delete some previously cached perception models according to an update policy if the cache is full.

(9) Analyze and recognize image data of the photo according to the perception model <piazza.model>. A specific recognition process is as follows, reading the image, generating multiple partial image areas from the original image using a sliding window, inputting the partial area images into a convolutional neural network that is configured according to a link weight parameter in the <piazza.model> file, and outputting one to multiple recognition results, for example, <flowerbed, bench, tourist, bus, car, police officer, child, balloon, cafe>.

For another example, an execution body is a mobile phone, and the target perception data is a photo taken in a kitchen of an indoor user John.

(1) The mobile phone obtains the photo, and performs recognition processing on the photo.

(2) Extract a feature, such as a GIST, dense SIFT, or Texton Histograms, from the photo, input these features into a previously trained scenario classification model (an SVM multi-class classifier), perform scenario recognition, and recognize a scenario as an indoor scenario.

(3) Further, obtain an accurate location of the mobile phone on an indoor map using a WI-FI signal and a SLAM function, that is, the kitchen of the user John's house.

(4) Further restrict the scenario of the photo to the kitchen according to the positioning information.

(5) Determine whether a perception model library locally cached in the terminal has a perception model corresponding to the kitchen, and if the perception model library locally cached in the terminal has the perception model corresponding to the kitchen, go to (6), or if the perception model library locally cached in the terminal has no perception model corresponding to the kitchen, go to (7).

(6) Obtain the perception model corresponding to the kitchen, for example, <kitchen.model>, from the perception model library locally cached in the terminal, and go to (9).

(7) Send, to a network-side server, an ID of the mobile phone, a request sequence number, and the recognized scenario, that is, an identifier (a number or a type) of the kitchen, to request the perception model of the kitchen.

(8) Receive the perception model that corresponds to the kitchen and sent by the server, for example, <kitchen.model>, cache the received model parameter file <kitchen.model> in the perception model library in the mobile phone, and delete some previously cached perception models according to an update policy if the cache is full.

(9) Analyze and recognize image data of the photo according to the perception model <kitchen.model>. A specific recognition process is as follows, reading the image, generating multiple partial image areas from the original image using a sliding window, inputting the partial area images into a convolutional neural network that is configured according to a link weight parameter in the <kitchen.model> file, and outputting one to multiple recognition results, for example <gas stove, extractor hood, cupboard, wok, spoon, seasoning box>.

Therefore, in the data processing method in this embodiment of the present disclosure, a scenario to which perception data that needs to be recognized belongs is determined, and a recognition result of the perception data is obtained through computation using a perception model corresponding to the scenario, which can reduce computation complexity and then can improve data processing efficiency.

Optionally, in an embodiment, the target perception data may be directly sent to the server to request the target perception model used to process the target perception data.

The processing of the target perception data includes the following steps.

(1) Obtain target perception data, where the target perception data may be any type of the following data, image data, video data, or voice data.

(2) Request, from a server, a perception model used to process the target perception data.

(3) Receive a target perception model that is sent by the server after the server determines a target scenario to which the target perception data belongs and that corresponds to the target scenario.

(4) Compute a recognition result of the target perception data according to the target perception model.

It should be understood that, in the various embodiments of the present disclosure, the sequence numbers of the foregoing processes do not mean an execution order, and the execution order of the processes should be determined according to functions and internal logic of the processes, which should not constitute any limitation on an implementation process of the embodiments of the present disclosure.

It should be further understood that, in this embodiment of the present disclosure, when recognition processing is performed on target perception data, a target scenario to which the target perception data belongs is first determined, and then a recognition result of the target perception data is obtained through computation using a target perception model corresponding to the target scenario. Accuracy of recognizing an object in a specific scenario using a perception model corresponding to the scenario is relatively high. Therefore, in comparison with a perception computation model used to process perception data in different scenarios, computation complexity of a perception model corresponding to each scenario in this embodiment of the present disclosure is greatly reduced, thereby effectively lowering a requirement for a computation capability as well as improving data processing efficiency. It should be further understood that, the data processing method in this embodiment of the present disclosure may be performed by a terminal, or by a server, or by a combination of a terminal and a server. This is not limited in this embodiment of the present disclosure.

Therefore, in the data processing method in this embodiment of the present disclosure, a scenario to which perception data that needs to be recognized belongs is determined, and a recognition result of the perception data is obtained using a perception model corresponding to the scenario, which can reduce computation complexity and then can improve data processing efficiency.

The above describes in detail the data processing method according to this embodiment of the present disclosure from an angle of a terminal with reference to FIG. 1. The following describes a data processing method according to an embodiment of the present disclosure from an angle of a server with reference to FIG. 2 and FIG. 3.

Figure 2:
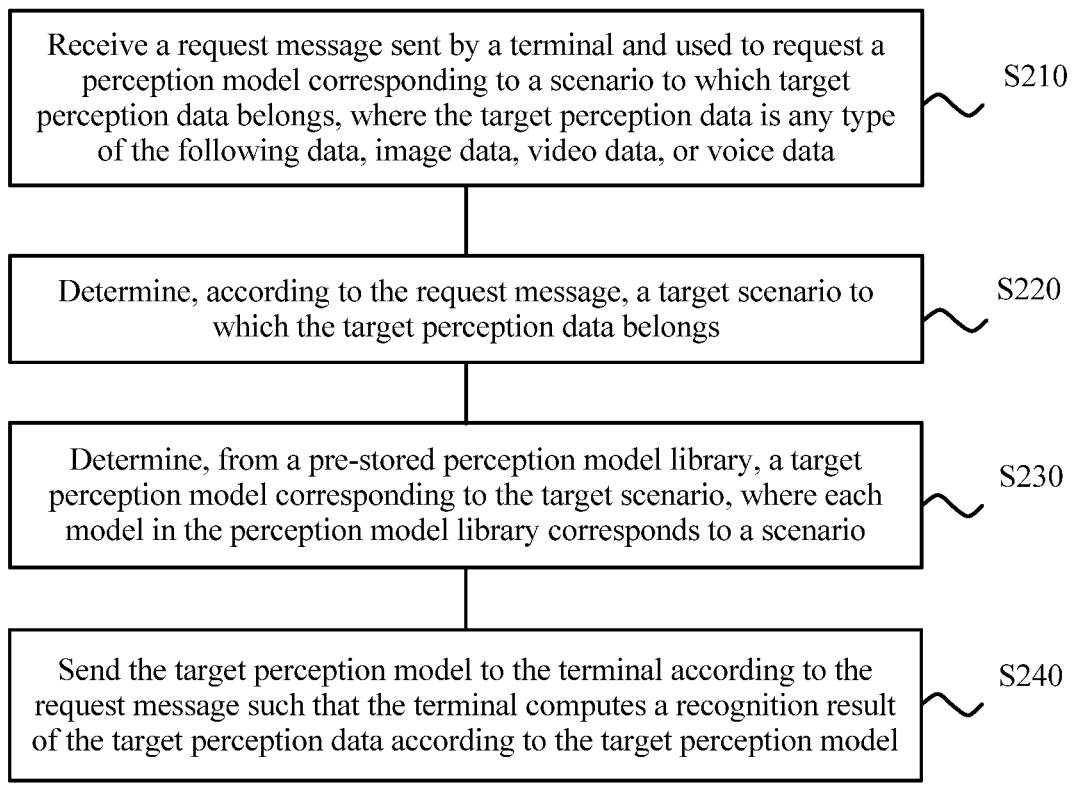
FIG. 2 shows a schematic flowchart of a data processing method according to another embodiment of the present disclosure.

As shown in FIG. 2, a data processing method 200 according to an embodiment of the present disclosure may be performed, for example, by a server. The method 200 includes the following steps.

Step S210: Receive a request message sent by a terminal and used to request a perception model corresponding to a scenario to which target perception data belongs, where the target perception data is any type of the following data image data, video data, or voice data.

Further, the target perception data may be data measured or generated by a sensing apparatus such as a camera, a microphone, an infrared sensor, or a depth sensor. For example, the target perception data is a picture, a video, or a recording.

The request message may include only the target perception data, that is, the perception model used to process the target perception data is directly requested from the server. It should be understood that, in this case, the server determines the target scenario to which the target perception data belongs, and further determines the corresponding target perception model. Alternatively, the request message may directly include an identifier used to indicate the target scenario to which the target perception data belongs, that is, the request message is used to request the perception model corresponding to the target scenario. In this case, the server may directly determine the target scenario according to the request message, and further determine the corresponding perception model.

Step S220: Determine, according to the request message, a target scenario to which the target perception data belongs.

Further, when the request message sent by the terminal includes the target perception data, scenario analysis and recognition may be performed on the target perception data to determine the target scenario to which the target perception data belongs. The target scenario may be directly determined according to the request message when the request message sent by the terminal indicates the scenario to which the target perception data belongs. This is not limited in this embodiment of the present disclosure.

Optionally, in this embodiment of the present disclosure, determining, according to the request message, the target scenario to which the target perception data belongs in step S220 includes performing scenario analysis on the target perception data included in the request message, and determining the target scenario to which the target perception data belongs.

Further, a scenario recognizer may be used to perform scenario analysis on the target perception data in order to determine the target scenario to which the target perception data belongs. The scenario recognizer may be an existing scenario classification model, for example, a SVM multi-class classifier. Further, for example, the target perception data is data obtained by a camera. A feature such as a GIST, Dense SIFT, or a texton histogram of an image is extracted from the camera data. These features are input to a previously trained SVM multi-class classifier. Scenario recognition is performed, and a scenario type is output. For example, it is recognized that a scenario is "a piazza."

Further, in a case in which the target perception model is perception data generated at a location at which the terminal is currently located, the scenario to which the target perception data belongs may be further restricted according to positioning information of the location at which the terminal is currently located.

Optionally, in this embodiment of the present disclosure, the target perception data is the data generated at the location at which the terminal is currently located.

Determining the target scenario to which the target perception data belongs includes performing scenario analysis on the target perception data according to positioning information of the location at which the terminal is currently located, and determining the target scenario.

Further, for example, the target perception data is a photo taken in a piazza A at which the terminal is currently located. An SVM multi-class classifier performs scenario analysis on the target perception data, and a recognition result of the scenario analysis is that a target scenario to which the target perception data belongs is a piazza. Then, positioning information of the location at which the terminal is currently located (that is, the piazza A) is obtained, and the target scenario to which the target perception data belongs may be further restricted from the piazza to the piazza A according to the positioning information. For another example, the target perception data is a photo taken at a kitchen at which the terminal is currently located. An SVM multi-class classifier performs scenario analysis on the target perception data, and a recognition result of the scenario analysis is that a target scenario to which the target perception data belongs is an indoor scenario. Then, positioning information of the location at which the terminal is currently located (that is, the kitchen) is obtained, and the target scenario to which the target perception data belongs may be further restricted from the indoor scenario to the kitchen according to the positioning information.

It can be learned that, in this embodiment of the present disclosure, the scenario to which the target perception data belongs may be further restricted to a smaller spatial-temporal area according to the positioning information of the terminal. It should be understood that a perception model corresponding to a more specific scenario with a relatively small range is correspondingly more simplified, computation complexity of the perception model is relatively low, and a computation workload of subsequent recognition computation of perception data based on the perception model is also relatively small.

It should be understood that, in this embodiment of the present disclosure, any existing positioning method or a combination of multiple positioning methods may be used to obtain positioning information of a current location of a terminal. This is not limited in the present disclosure.

The target scenario may be directly determined according to the request message when the request message sent by the terminal indicates the scenario to which the target perception data belongs.

Optionally, in this embodiment of the present disclosure, determining, according to the request message, the target scenario to which the target perception data belongs in step S220 includes determining the target scenario according to the identifier included in the request message and used to indicate the target scenario.

Step S230: Determine, from a pre-stored perception model library, a target perception model corresponding to the target scenario, where each model in the perception model library corresponds to a scenario.

The pre-stored perception model library stores perception models that are respectively corresponding to different scenario and that are obtained through training according to different pieces of perception data and sample data of different scenarios.

Further, a storage form of the perception models that are of the different scenarios and in the perception model library may be a scenario identifier+a perception model. It should be understood that the storage form of the perception models that are of the different scenarios and in the perception model library may be any other forms, which is not limited in this embodiment of the present disclosure, provided that a corresponding perception model can be obtained from the perception model library according to a scenario identifier (a scenario number or a type).

Step S240: Send the target perception model to the terminal according to the request message such that the terminal computes a recognition result of the target perception data according to the target perception model.

Therefore, according to the data processing method in this embodiment of the present disclosure, a perception model corresponding to a scenario to which perception data that needs to be recognized belongs is provided to a terminal such that the terminal processes the corresponding perception data according to the perception model. Complexity of a perception model corresponding to a specific scenario is relatively low, and model accuracy is relatively high. Therefore, computation complexity can be effectively reduced, and data processing speed and accuracy can also be improved.

In this embodiment of the present disclosure, the pre-stored perception model library stores the perception models that are respectively corresponding to the different scenarios and obtained through training according to the different perception data and the sample data of the different scenarios.

Optionally, in this embodiment of the present disclosure, before the request message is received, the method 200 further includes the following steps, which are not included in FIG. 2.

Step S250: Obtain a perception data sample, where the perception data sample includes at least a part of perception data that has scenario annotation information and object annotation information.

Step S260: Train, according to the perception data sample, perception models respectively corresponding to different scenarios.

Step S270: Store, in the perception model library, the perception models respectively corresponding to the different scenarios, where the perception model library includes the target perception model.

Figure 3:
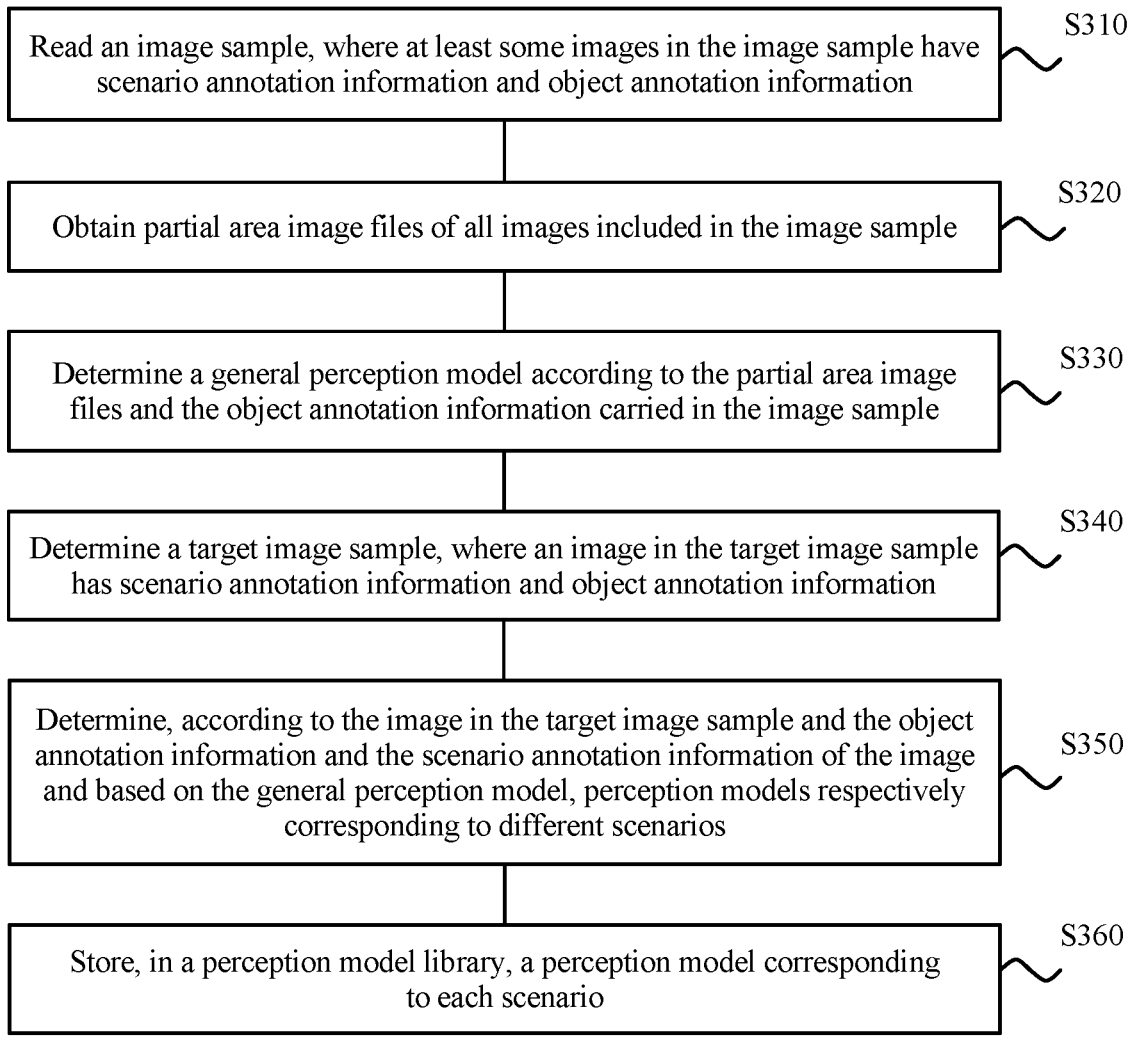
FIG. 3 shows a schematic flowchart of perception model training according to another embodiment of the present disclosure.

Further, for example, the perception data is image data. Specific steps of training perception models corresponding to different scenarios are shown in FIG. 3.

Step S310: Read an image sample, where at least some images in the image sample have scenario annotation information and object annotation information.

Further, for example, scenario annotation information of an image Img00001 in the image sample is <scenario: piazza>, and object annotation information is <objects: flowerbed, bench, tourist, bus, bus stop, car, police officer, child, balloon, cafe, pigeon>. Further, the object annotation information of the image may further include a location of an object in the image, where the location is represented, for example, using a partial rectangular area.

It should be understood that, in this embodiment of the present disclosure, some images in the image sample may have both scenario annotation information and object annotation information, some other images may have only object annotation information, and still some images may have neither scenario annotation information nor object annotation information. It should be further understood that, all images in the image sample may have respective scenario annotation information and object annotation information. This is not limited in this embodiment of the present disclosure, provided that at least some images in the image sample are ensured to have scenario annotation information and object annotation information.

Step S320: Obtain partial area image files of all images included in the image sample.

Further, partial area extraction is performed on all the images included in the image sample that is read. For example, multiple partial image areas are captured from an image P (any original image in the image sample) from left to right and from top to bottom using rectangular sliding windows of different sizes, to generate multiple partial area image files. In particular, multiple 200*200 and 400×400 partial image areas are captured from a 3264×2448 original image from left to right and from top to bottom using rectangular sliding windows whose sizes are respectively 200×200 and 400×400, to generate multiple partial area image files of the original image.

Step S330: Determine a general perception model according to the partial area image files and the object annotation information carried in the image sample, which is also referred to as determining a parameter file of a general perception model.

Further, the partial area image files that are of all original images in the image sample and that are generated in step S320 are used as input of the general perception model, and the parameter file of the general perception model is determined with reference to object type computation information output by the general perception model and the object annotation information carried in the image sample.

It should be understood that the general perception model may be considered as a model obtained after a CNN model is combined with a logistic regression (SOFTMAX) model that supports multi-class classification. For example, steps of determining the general perception model include using the partial area image files as input of the CNN model, and correspondingly outputting, by the CNN model, related matrix information, then, using the matrix information output by the CNN model as input of the SOFTMAX model, and correspondingly outputting, by the SOFTMAX model, an object type computation result, and obtaining parameters of the CNN model and those of the SOFTMAX model through computation based on the object type computation result and the object annotation information (a matching degree between the object type computation result and the object annotation information, or an error rate) carried in the image sample, that is, determining the general perception model.

It should be further understood that a method for determining the general perception model in step S330 may be an existing related method. For brevity, details are not described herein.

Step S340: Determine a target image sample, where an image in the target image sample has scenario annotation information and object annotation information.

Further, an image that has both scenario annotation information and object annotation information is selected from the image sample that is read in step S310, and images of this type are determined as the target image sample. For example, annotation information of first-type images is: <scenario: restaurant; objects: chair, table, wine bottle, plate, chopsticks>, annotation information of second-type images is: <scenario: piazza; objects: flowerbed, bench, tourist, bus, car, police officer, child, balloon, cafe>, annotation information of third-type images is: <scenario: piazza; objects: flowerbed, bench, tourist, bus, bus stop, car, balloon, cafe, pigeon>, annotation information of fourth-type images is: <scenario: sickroom; objects: sickbed, patient monitor, respirator, beeper, support, waste container>, annotation information of fifth-type images is <scenario: kitchen; objects: kettle, water tap, microwave oven, salt pot, sugar bowl, tomato sauce, plate, gas stove>.

It should be understood that, in the target image sample determined in step S340, each scenario corresponds to an image set that includes multiple images, and it should not be understood that one scenario corresponds to only one image. In other words, the foregoing mentioned first-type images whose scenario annotation information is <scenario: restaurant> are a set of multiple images.

Step S350: Determine, according to the image in the target image sample and the object annotation information and the scenario annotation information of the image and based on the general perception model, perception models respectively corresponding to different scenarios.

Further, partial area image files (obtained in step S320) of the third-type images whose scenario annotation information is <scenario: piazza> are used as input of the general perception model determined in step S330. Correspondingly, the general perception model outputs object type computation information obtained through computation. Then, an error rate of the object type computation information is determined according to an object type indicated by the object annotation information carried in the third-type images, and complexity of the general perception model is measured. Parameters of the general perception model are adjusted and simplified by considering both the error rate and the complexity, where simplification of the parameters includes clustering and combining compute nodes that have similar parameters, deleting a parameter that does not contribute to output, and the like. An error rate of the object type computation information and complexity of the general perception model both meet a predetermined condition after the parameters of the general perception model are adjusted and simplified in the foregoing manner. In this case, the perception model that undergoes parameter simplification may become a perception model corresponding to the scenario <piazza>. It should be understood that, in the foregoing process of determining the perception model corresponding to the scenario <piazza>, the general perception model determined in step S330 is backed up for subsequently determining a perception model corresponding to another scenario. It should be further understood that, similarly, perception models corresponding to all other scenarios may be obtained.

In comparison with globally applicable object recognition, a quantity of types of objects to be recognized in a specific scenario is relatively small. Therefore, a quantity of parameters of a perception model corresponding to each scenario is greatly reduced in comparison with a quantity of parameters of the general perception model determined in step S330, which can effectively reduce computation complexity while improving accuracy of recognition computation.

Step S360: Store, in a perception model library, a perception model corresponding to each scenario.

It should be understood that the foregoing embodiment is only intended to help better understand the present disclosure, instead of limiting the present disclosure.

It should be understood that types of objects that appear in each scenario are limited. For example, in an outdoor scenario or a city scenario, an object such as a person, a vehicle, a building, or a character may need to be recognized, but basically, there is no need for recognizing various animals and plants. In other words, a quantity of types of objects that frequently appear in each scenario and need to be recognized is relatively small. Correspondingly, a perception model corresponding to each scenario has a relatively small quantity of model parameters such that computation complexity of the perception model corresponding to each scenario is greatly reduced, and a requirement for storage space is not very high. Therefore, according to the data processing method proposed in the present disclosure, complexity and a computation workload of a perception model can be greatly reduced while data recognition accuracy is maintained or even improved, which resolves a contradiction between a computation capability and model complexity in order to effectively improve a recognition capability.

It should be further understood that the foregoing process of training a perception model corresponding to each scenario (equivalent to a process of updating a perception model library) is not limited to be performed for only once before a request message sent by a terminal and that requests a target perception model for processing target perception data is received. The process of training a perception model may also be periodically performed according to a specific period. In this case, reference may be made to perception data requested by the terminal in real time, and perception data and a scenario sample library are continuously enriched and replenished. Therefore, scenario types and perception models corresponding to the scenario types are further replenished and perfected, and accuracy of recognition computation of a perception model corresponding to each scenario can be continuously improved.

Therefore, according to the data processing method in this embodiment of the present disclosure, a perception model corresponding to a scenario to which perception data that needs to be recognized belongs is provided to a terminal such that the terminal processes the corresponding perception data according to the perception model. Complexity of a perception model corresponding to a specific scenario is relatively low, and model accuracy is relatively high. Therefore, computation complexity can be effectively reduced, and data processing speed and accuracy can be improved.

It should be further understood that, a "pre-stored perception model library" is mentioned in both the data processing method 100 and the data processing method 200 in the above. To sum up, the "pre-stored perception model library" stores a perception model that corresponds to each scenario and that processes perception data. However, the "pre-stored perception model library" in the method 100 is slightly different from that in the method 200 in terms of meaning. Specific descriptions are as follows. The data processing method 100 provided in the embodiment of the present disclosure is performed, for example, by a terminal, and the "pre-stored perception model library" is a storage area, in the terminal, used to cache a perception model that corresponds to each scenario and that is obtained from a server. In other words, a perception model stored in the "pre-stored perception model library" is a perception model corresponding to a scenario to which processed or to-be-processed perception data belongs, and may not include perception models respectively corresponding to all scenarios. However, the data processing method 200 provided in the embodiment of the present disclosure is generally performed by a server, and the pre-stored perception model library is a storage area, in the server, used to store a perception model that corresponds to each scenario and that is generated according to different pieces of perception data and training samples of different scenarios, which may be understood as that the "pre-stored perception model library" in the server includes perception models respectively corresponding to all scenarios.

The above describes in detail the data processing method according to the embodiments of the present disclosure with reference to FIG. 1 to FIG. 3. The following describes in detail a data processing device according to an embodiment of the present disclosure with reference to FIG. 4 to FIG. 7.

Figure 4:
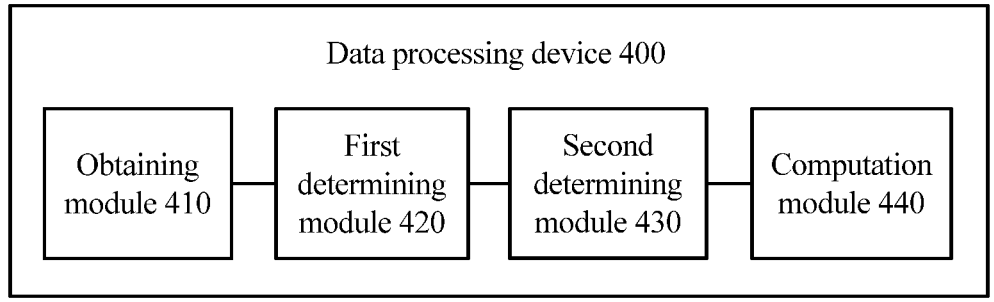
FIG. 4 shows a schematic block diagram of a data processing device according to an embodiment of the present disclosure.

FIG. 4 shows a schematic block diagram of a data processing device 400 according to an embodiment of the present disclosure. As shown in FIG. 4, the device 400 includes an obtaining module 410 configured to obtain target perception data, where the target perception data is any type of the following data, image data, video data, or voice data, a first determining module 420 configured to determine a target scenario to which the target perception data obtained by the obtaining module 410 belongs, a second determining module 430 configured to determine a target perception model corresponding to the target scenario determined by the first determining module 420, and a computation module 440 configured to compute, according to the target perception model determined by the second determining module 430, a recognition result of the target perception data obtained by the obtaining module 410.

Therefore, the data processing device 400 in this embodiment of the present disclosure determines a scenario to which perception data that needs to be recognized belongs, and obtains a recognition result of the perception data through computation using a perception model corresponding to the scenario, which can reduce computation complexity and then can improve data processing efficiency in comparison with the other approaches.

Further, the computation module 440 may be a perception computation processor, and a function of the computation model 440 is to perform perception computation, for example, performing recognition processing on perception data according to an algorithm model such as a CNN or a DNN. Data block selection, cascade convolution and sampling computation at each layer of the neural network, and classification matrix computation are sequentially performed on input perception data, to generate a recognition result. A computation process includes but is not limited to the following, being completely performed by a general purpose CPU, or partially performed by a GPU acceleration chip, or performed by a dedicated chip.

Optionally, in an embodiment, the first determining module 420 is further configured to perform scenario analysis on the target perception data, and determine the target scenario.

Further, the first determining module 420 may be a scenario recognizer, and a function of the first determining module 420 is to recognize a scenario to which input perception data belongs. The perception data is input, and a scenario type or scenario number or another identifier that may represent a scenario is output.

Optionally, in an embodiment, the target perception data is data generated at a location at which a terminal is currently located.

The first determining module 420 is further configured to perform scenario analysis on the target perception data according to positioning information of the location at which the terminal is currently located, and determine the target scenario.

Further, the perception data and the positioning information are input into the first determining module 420, and a scenario type or number is output.

Optionally, in an embodiment, the first determining module 420 includes a first sending unit (not shown) configured to send, to a server, a first request used to request a scenario to which the target perception data belongs, and a first receiving unit (not shown) configured to receive the target scenario that is sent by the server according to the first request.

Optionally, in an embodiment, the second determining module 430 is further configured to determine, from a pre-stored perception model library, the target perception model corresponding to the target scenario, where each perception model in the perception model library corresponds to a scenario.

Figure 5:
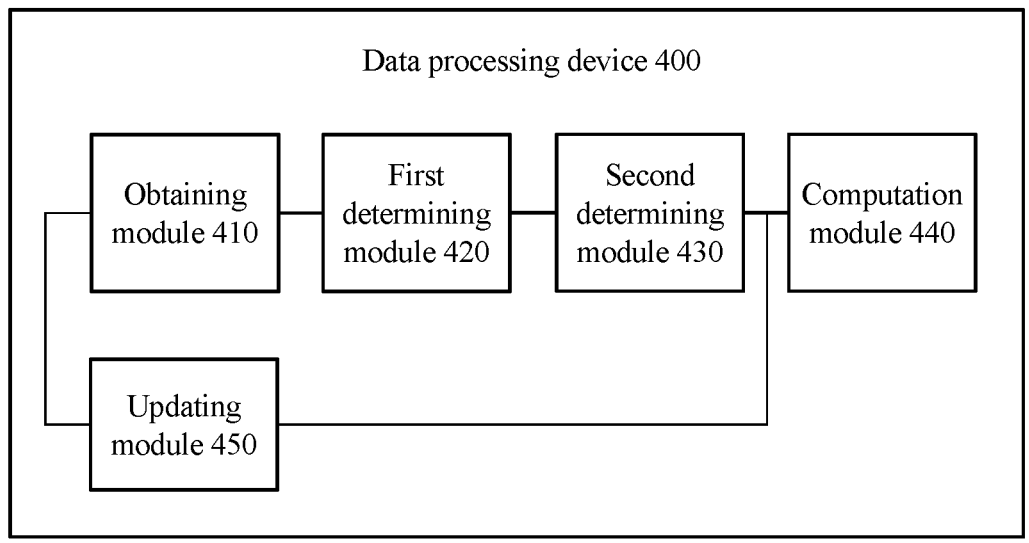
FIG. 5 shows another schematic block diagram of a data processing device according to an embodiment of the present disclosure.

Optionally, as shown in FIG. 5, in an embodiment, a data processing device 400 includes an obtaining module 410 configured to obtain target perception data, where the target perception data is any type of the following data image data, video data, or voice data, a first determining module 420 configured to determine a target scenario to which the target perception data obtained by the obtaining module 410 belongs, a second determining module 430 configured to determine a target perception model corresponding to the target scenario determined by the first determining module 420, a computation module 440 configured to compute, according to the target perception model determined by the second determining module 430, a recognition result of the target perception data obtained by the obtaining module 410, and an updating module 450 configured to update a perception model library according to a historical scenario sequence of a user before the obtaining module 410 obtains the target perception data, where the updated perception model library includes the target perception model corresponding to the target scenario.

It should be understood that the updating module 450 may store the target perception model in the pre-stored perception model library after the second determining module 430 obtains the target perception model by requesting the target perception model from a server in order to update the perception model library. The updating module 450 may further request, before the obtaining module 410 obtains the target perception data on which recognition computation needs to be performed, a to-be-needed perception model from a server in advance using a prediction algorithm, that is, update the pre-stored perception model library in advance.

Optionally, in an embodiment, the second determining module 430 includes a second sending unit (not shown) configured to send, to a server, a second request used to request the perception model corresponding to the target scenario when the pre-stored perception model library has no perception model corresponding to the target scenario, where each perception model in the perception model library corresponds to a scenario, and a second receiving unit (not shown) configured to receive the target perception model that corresponds to the target scenario and sent by the server according to the second request.

Optionally, in this embodiment of the present disclosure, the data processing device 400 further includes a caching module (not shown) configured to cache, in the pre-stored perception model library, the target perception model received by the second receiving unit and a scenario identifier (a scenario type or a scenario number). Further, the caching module may be a high-speed access device such as a memory.

Therefore, the data processing device 400 in this embodiment of the present disclosure determines a scenario to which perception data that needs to be recognized belongs, and obtains a recognition result of the perception data through computation using a perception model corresponding to the scenario, which can reduce computation complexity and then can improve data processing efficiency in comparison with the other approaches.

It should be understood that, the data processing device 400 according to this embodiment of the present disclosure may be corresponding to the terminal in the data processing method in the embodiments of the present disclosure. In addition, the foregoing and other operations and/or functions of the modules in the device 400 are respectively used to implement corresponding processes of the methods in FIG. 1 to FIG. 3. For brevity, details are not described herein again.

The above describes in detail the data processing device 400 according to the embodiments of the present disclosure with reference to FIG. 4 and FIG. 5. The following describes in detail another data processing device according to an embodiment of the present disclosure with reference to FIG. 6 and FIG. 7.

Figure 6:
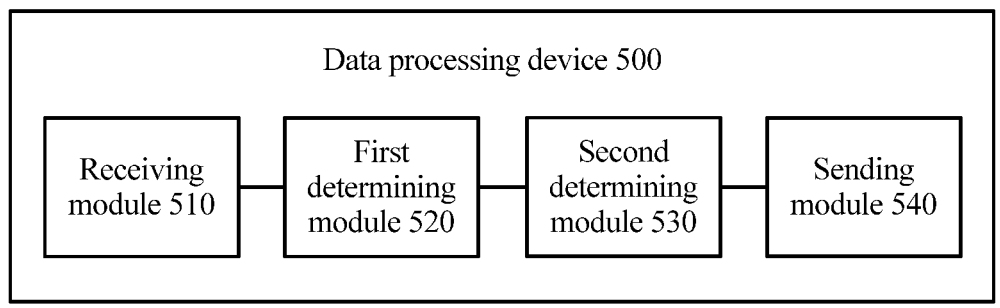
FIG. 6 shows a schematic block diagram of a data processing device according to another embodiment of the present disclosure.

FIG. 6 shows a schematic block diagram of a data processing device 500 according to an embodiment of the present disclosure. As shown in FIG. 6, the data processing device 500 includes a receiving module 510 configured to receive a request message that is sent by a terminal and used to request a perception model corresponding to a scenario to which target perception data belongs, where the target perception data is any type of the following data, image data, video data, or voice data, a first determining module 520 configured to determine, according to the request message received by the receiving module 510, a target scenario to which the target perception data belongs, a second determining module 530 configured to determine, from a prestored perception model library, the target perception model corresponding to the target scenario determined by the first determining module 520, where each model in the perception model library corresponds to a scenario, and a sending module 540 configured to send, to the terminal according to the request message received by the receiving module 510, the target perception model determined by the second determining module 530 such that the terminal computes a recognition result of the target perception data according to the target perception model.

Therefore, the data processing device 500 in this embodiment of the present disclosure provides, to a terminal, a perception model that corresponds to a scenario and needed by the terminal such that the terminal processes corresponding perception data according to the perception model. Complexity of a perception model corresponding to a specific scenario is relatively low, and model accuracy is relatively high. Therefore, computation complexity can be effectively reduced, and data processing speed and accuracy can be improved.

Figure 7:
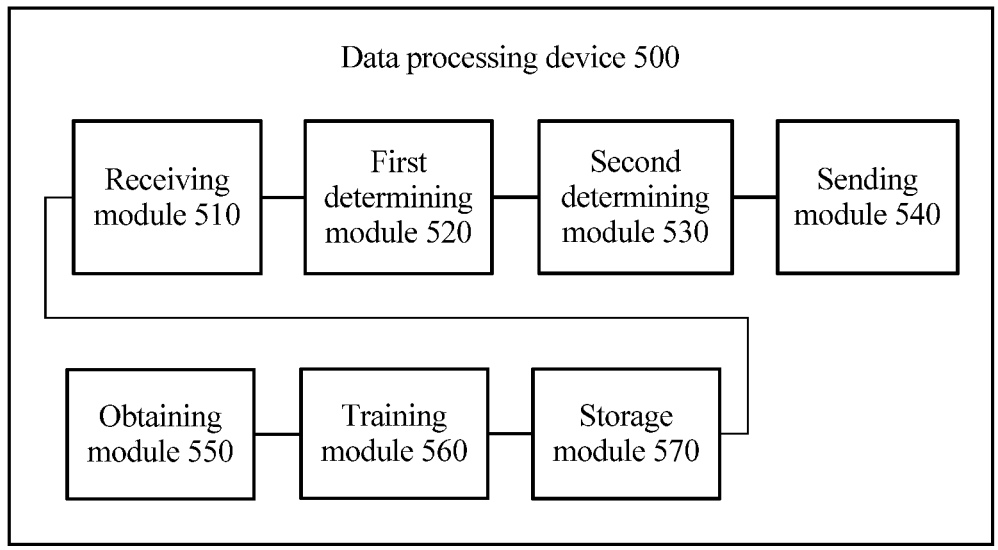
FIG. 7 shows another schematic block diagram of a data processing device according to another embodiment of the present disclosure.

As shown in FIG. 7, optionally, in an embodiment, the device 500 includes a receiving module 510 configured to receive a request message that is sent by a terminal and used to request a perception model corresponding to a scenario to which target perception data belongs, where the target perception data is any type of the following data, image data, video data, or voice data, a first determining module 520 configured to determine, according to the request message received by the receiving module 510, a target scenario to which the target perception data belongs, a second determining module 530 configured to determine, from a prestored perception model library, the target perception model corresponding to the target scenario determined by the first determining module 520, where each model in the perception model library corresponds to a scenario, a sending module 540 configured to send, to the terminal according to the request message received by the receiving module 510, the target perception model determined by the second determining module 530 such that the terminal computes a recognition result of the target perception data according to the target perception model, an obtaining module 550 configured to obtain a perception data sample before the receiving module 510 receives the request message, where the perception data sample includes at least a part of perception data that has scenario annotation information and object annotation information, a training module 560 configured to train, according to the perception data sample, perception models respectively corresponding to different scenarios, and a storage module 570 configured to store, in the perception model library, the perception models that are respectively corresponding to the different scenarios and obtained through training by the training module 560, where the perception model library includes the target perception model.

Further, the training module 560 may be referred to as a model training server. A function of the model training server is to read a training sample database, and train, according to each scenario classification description in a scenario knowledge base, perception model parameters needed in each scenario. The training sample data and a scenario classification description file are input into the training module 560, and a perception model parameter file of each scenario is output.

The scenario knowledge base is storage space used to manage and store classification descriptions corresponding to various scenarios. The classification descriptions corresponding to various scenarios include categories that may occur in various scenarios, for example, an object, a person, an action behavior, an event, and a character, and may further include a hierarchical relationship between all the categories, for example, animal—dog—Golden Retriever, vehicle—car—BMW—BMW 3 series, and party—birthday party. In addition, for a specific scenario with a known space structure, the scenario knowledge base may further include space structure information and a scenario number corresponding to each space area.

Further, the storage module 570 is configured to store the model parameter file that is of each scenario and generated by the training module 560 (the model training server). For example, the model parameter file includes a scenario identifier (a type or a number) and a corresponding model parameter file. The storage module 570 may be referred to as a model parameter library.

Optionally, in an embodiment, the first determining module 520 is further configured to perform scenario analysis on the target perception data included in the request message, and determine the target scenario to which the target perception data belongs.

Optionally, in an embodiment, the target perception data is data generated at a location at which the terminal is currently located.

The first determining module 520 is further configured to perform scenario analysis on the target perception data according to positioning information of the location at which the terminal is currently located, and determine the target scenario.

Optionally, in an embodiment, the first determining module 520 is further configured to determine the target scenario according to an identifier that is included in the request message and used to indicate the target scenario.

Therefore, the data processing device 500 in this embodiment of the present disclosure provides, to a terminal, a perception model that corresponds to a scenario and needed by the terminal such that the terminal processes corresponding perception data according to the perception model. Complexity of a perception model corresponding to a specific scenario is relatively low, and model accuracy is relatively high. Therefore, computation complexity can be effectively reduced, and data processing speed and accuracy can be improved.

It should be understood that, the data processing device 500 according to this embodiment of the present disclosure may be corresponding to the server in the data processing method in the embodiments of the present disclosure. In addition, the foregoing and other operations and/or functions of the modules in the device 500 are respectively used to implement corresponding processes of the methods in FIG. 1 to FIG. 3. For brevity, details are not described herein again.

Figure 8:
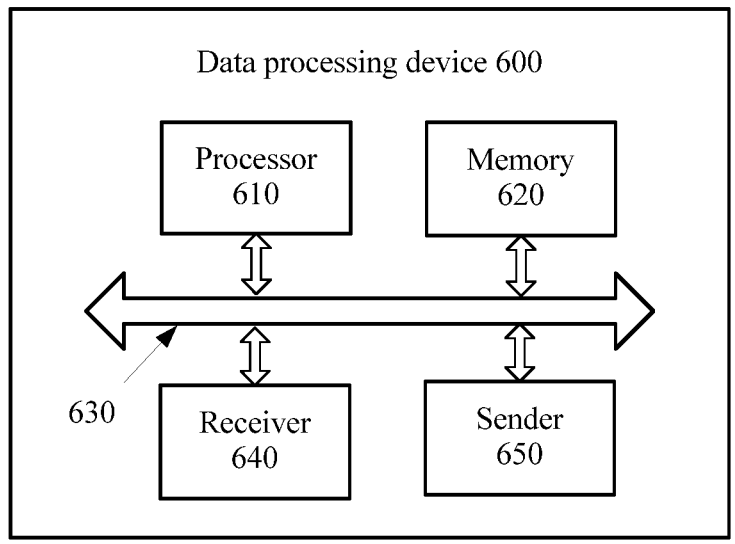
FIG. 8 shows a schematic block diagram of a data processing device according to an embodiment of the present disclosure.

As shown in FIG. 8, an embodiment of the present disclosure further provides a data processing device 600. The data processing device 600 includes a processor 610, a memory 620, a bus system 630, a receiver 640, and a sender 650. The processor 610, the memory 620, the receiver 640, and the sender 650 are connected using the bus system 630. The memory 620 is configured to store an instruction. The processor 610 is configured to execute the instruction stored in the memory 620 in order to control the receiver 640 to receive a signal and control the sender 650 to send a signal. The processor 610 is configured to obtain target perception data, where the target perception data is any type of the following data, image data, video data, or voice data, determine a target scenario to which the target perception data belongs, determine a target perception model corresponding to the target scenario, and compute a recognition result of the target perception data according to the target perception model.

Therefore, the data processing device 600 in this embodiment of the present disclosure determines a scenario to which perception data that needs to be recognized belongs, and obtains a recognition result of the perception data through computation using a perception model corresponding to the scenario, which can reduce computation complexity and then can improve data processing efficiency in comparison with the other approaches.

Optionally, in an embodiment, the processor 610 is further configured to perform scenario analysis on the target perception data, and determine the target scenario.

Optionally, in an embodiment, the target perception data is data generated at a location at which a terminal is currently located.

The processor 610 is further configured to perform scenario analysis on the target perception data according to positioning information of the location at which the terminal is currently located, and determine the target scenario.

Optionally, in an embodiment, the sender 650 is configured to send, to a server, a first request used to request the scenario to which the target perception data belongs. The receiver 640 is configured to receive the target scenario sent by the server according to the first request.

Optionally, in an embodiment, the processor 610 is further configured to determine, from a pre-stored perception model library, the target perception model corresponding to the target scenario, where each perception model in the perception model library corresponds to a scenario.

Optionally, in an embodiment, the processor 610 is further configured to update the perception model library according to a historical scenario sequence of a user before obtaining the target perception data, where the updated perception model library includes the target perception model corresponding to the target scenario.

Optionally, in an embodiment, the sender 650 is configured to send, to a server, a second request used to request the perception model corresponding to the target scenario when a pre-stored perception model library has no perception model corresponding to the target scenario, where each perception model in the perception model library corresponds to a scenario. The receiver 640 is configured to receive the target perception model that corresponds to the target scenario and sent by the server according to the second request.

It should be understood that, in this embodiment of the present disclosure, the processor 610 may be a CPU, or the processor 610 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any regular processor.

The memory 620 may include a read-only memory (ROM) and a random access memory (RAM), and provides an instruction and data to the processor 610. A part of the memory 620 may further include a non-volatile RAM. For example, the memory 620 may further store device type information.

In addition to a data bus, the bus system 630 may further include a power bus, a control bus, a status signal bus, and the like. However, for clear description, various buses are all marked as the bus system 630 in the figure.

In an implementation process, the steps of the foregoing method may be completed using an integrated logic circuit of hardware in the processor 610 or using an instruction in a software form. The steps of the method disclosed with reference to the embodiments of the present disclosure may be directly performed and completed by a hardware processor, or performed and completed by a combination of hardware and software modules in the processor. The software module may be located in a mature storage medium in the art, such as a RAM, a flash memory, a ROM, a programmable read-only memory (PROM) or an electrically erasable programmable read-only memory (EEPROM), or a register. The storage medium is located in the memory 620, and the processor 610 reads information from the memory 620 and completes the steps of the foregoing method in combination with hardware of the processor 610. To avoid repetition, details are not described herein again.

Therefore, the data processing device 600 in this embodiment of the present disclosure determines a scenario to which perception data that needs to be recognized belongs, and obtains a recognition result of the perception data through computation using a perception model corresponding to the scenario, which can reduce computation complexity and then can improve data processing efficiency in comparison with the other approaches.

It should be understood that, the data processing device 600 according to this embodiment of the present disclosure may be corresponding to the terminal in the data processing method in the embodiments of the present disclosure, and the device 600 may be further corresponding to the data processing device 400 in the embodiments of the present disclosure. In addition, the foregoing and other operations and/or functions of the modules in the device 600 are respectively used to implement corresponding processes of the methods in FIG. 1 to FIG. 3. For brevity, details are not described herein again.

Figure 9:
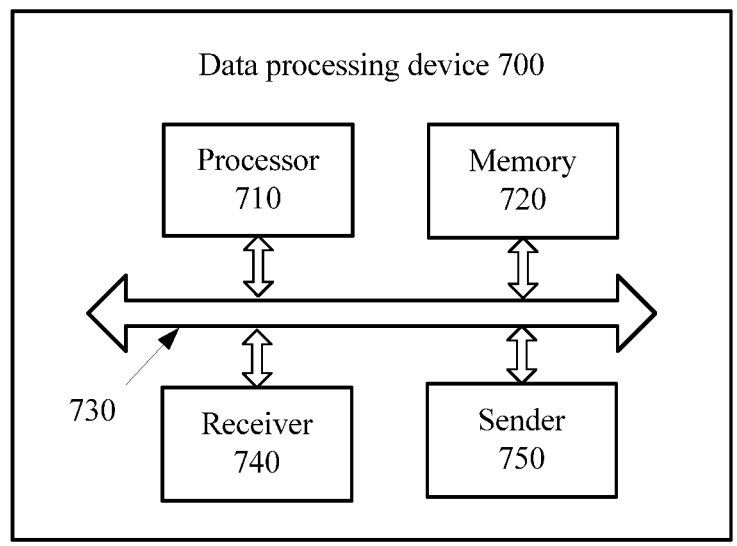
FIG. 9 shows a schematic block diagram of a data processing device according to another embodiment of the present disclosure.

As shown in FIG. 9, an embodiment of the present disclosure further provides a data processing device 700. The device 700 includes a processor 710, a memory 720, a bus system 730, a receiver 740, and a sender 750. The processor 710, the memory 720, the receiver 740, and the sender 750 are connected using the bus system 730. The memory 720 is configured to store an instruction. The processor 710 is configured to execute the instruction stored in the memory 720 in order to control the receiver 740 to receive a signal and control the sender 750 to send a signal.

The receiver 740 is configured to receive a request message that is sent by a terminal and used to request a perception model corresponding to a scenario to which target perception data belongs, where the target perception data is any type of the following data, image data, video data, or voice data. The processor 710 is configured to determine, according to the request message, the target scenario to which the target perception data belongs, and determine, from a pre-stored perception model library, the target perception model corresponding to the target scenario, where each model in the perception model library corresponds to a scenario. The sender 750 is configured to send the target perception model to the terminal according to the request message such that the terminal computes a recognition result of the target perception data according to the target perception model.

Therefore, the data processing device 700 in this embodiment of the present disclosure provides, to a terminal, a perception model that corresponds to a scenario and needed by the terminal such that the terminal processes corresponding perception data according to the perception model. Complexity of a perception model corresponding to a specific scenario is relatively low, and model accuracy is relatively high. Therefore, computation complexity can be effectively reduced, and data processing speed and accuracy can be improved.

Optionally, in an embodiment, the processor 710 is further configured to obtain a perception data sample before the receiver 740 receives the request message, where the perception data sample includes at least a part of perception data that has scenario annotation information and object annotation information, train, according to the perception data sample, perception models respectively corresponding to different scenarios, and store, in the perception model library, the perception models respectively corresponding to the different scenarios, where the perception model library includes the target perception model.

Optionally, in an embodiment, the processor 710 is further configured to perform scenario analysis on the target perception data in the request message, and determine the target scenario to which the target perception data belongs.

Optionally, in an embodiment, the target perception data is data generated at a location at which the terminal is currently located.

The processor 710 is further configured to perform scenario analysis on the target perception data according to positioning information of the location at which the terminal is currently located, and determine the target scenario.

Optionally, in an embodiment, the processor 710 is further configured to determine the target scenario according to an identifier that is included in the request message and used to indicate the target scenario.

It should be understood that, in this embodiment of the present disclosure, the processor 710 may be a CPU, or the processor 710 may be another general purpose processor, a DSP, an ASIC, an FPGA or another programmable logic device, a discrete gate or a transistor logic device, a discrete hardware component, or the like. The general purpose processor may be a microprocessor, or the processor 710 may be any regular processor.

The memory 720 may include a ROM and a RAM, and provides an instruction and data to the processor 710. A part of the memory 720 may further include a non-volatile RAM. For example, the memory 720 may further store device type information.

In addition to a data bus, the bus system 730 may further include a power bus, a control bus, a status signal bus, and the like. However, for clear description, various buses are all marked as the bus system 730 in the figure.

In an implementation process, the steps of the foregoing method may be completed using an integrated logic circuit of hardware in the processor 710 or using an instruction in a software form. The steps of the method disclosed with reference to the embodiments of the present disclosure may be directly performed and completed by a hardware processor, or performed and completed by a combination of hardware and software modules in the processor 710. The software module may be located in a mature storage medium in the art, such as a RAM, a flash memory, a ROM, a PROM or an EEPROM, or a register. The storage medium is located in the memory 720, and the processor 710 reads information from the memory 720 and completes the steps of the foregoing method in combination with hardware of the processor 720. To avoid repetition, details are not described herein again.

Therefore, the data processing device 700 in this embodiment of the present disclosure provides, to a terminal, a perception model that corresponds to a scenario and needed by the terminal such that the terminal processes corresponding perception data according to the perception model. Complexity of a perception model corresponding to a specific scenario is relatively low, and model accuracy is relatively high. Therefore, computation complexity can be effectively reduced, and data processing speed and accuracy can be improved.

It should be understood that, the data processing device 700 according to this embodiment of the present disclosure may be corresponding to the server in the data processing method in the embodiments of the present disclosure, and the device 700 may be further corresponding to the data processing device 500 in the embodiments of the present disclosure. In addition, the foregoing and other operations and/or functions of the modules in the device 700 are respectively used to implement corresponding processes of the methods in FIG. 1 to FIG. 3. For brevity, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed in a hardware or software manner depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a specific working process of a system, an apparatus, and a unit that are described above, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure, or some of the technical solutions, may be implemented in a form of a software product. The computer software product is stored in a storage medium, and includes some instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A data processing method, comprising:
    obtaining target perception data, wherein the target perception data comprises at least one of image data, video data, or a recording;
    determining a target scenario associated with the target perception data;
    determining a target perception model corresponding to the target scenario; and
    computing an object recognition result of the target perception data according to the target perception model.

2. The data processing method according to claim 1, wherein determining the target scenario associated with the target perception data comprises:
    performing a scenario analysis on the target perception data; and
    determining the target scenario based on the scenario analysis.

3. The data processing method according to claim 2, wherein the target perception data is data generated by a target generating terminal at a location, and wherein performing the scenario analysis on the target perception data comprises performing the scenario analysis on the target perception data according to positioning information of the location.

4. The data processing method according to claim 1, wherein determining the target scenario associated with the target perception data comprises:
    sending a first request for a scenario associated with the target perception data to a server; and
    receiving the target scenario from the server.

5. The data processing method according claim 1, wherein determining the target perception model corresponding to the target scenario comprises determining the target perception model corresponding to the target scenario from a pre-stored perception model library, wherein each perception model in the pre-stored perception model library corresponds to a scenario.

6. The data processing method according to claim 5, wherein before obtaining the target perception data, the method further comprises updating the pre-stored perception model library according to a foregoing scenario sequence of a user to obtain an updated perception model library, wherein the updated perception model library comprises the target perception model corresponding to the target scenario.

7. The data processing method according to claim 1, wherein determining the target perception model corresponding to the target scenario comprises:
    sending a second request for a perception model corresponding to the target scenario to a server when a pre-stored perception model library does not include the perception model corresponding to the target scenario, wherein each perception model in the pre-stored perception model library corresponds to a scenario; and
    receiving the target perception model corresponding to the target scenario from the server.

8. A data processing method, comprising:
    receiving a request message for a perception model corresponding to a scenario associated with target perception data from a terminal, wherein the target perception data comprises at least one of image data, video data, or a recording;
    determining a target scenario associated with the target perception data according to the request message;
    determining, from a pre-stored perception model library, a target perception model corresponding to the target scenario, wherein each model in the perception model library corresponds to a scenario; and
    sending the target perception model to the terminal according to the request message to prompt the terminal to compute an object recognition result of the target perception data according to the target perception model.

9. The data processing method according to claim 8, wherein before receiving the request message, the method further comprises:
    obtaining a perception data sample comprising at least a part of perception data having scenario annotation information and object annotation information;
    training perception models respectively corresponding to different scenarios according to the perception data sample; and
    storing the perception models respectively corresponding to the different scenarios in the perception model library, wherein the perception model library comprises the target perception model.

10. The data processing method according to claim 8, wherein determining the target scenario according to the request message comprises:
    performing a scenario analysis on the target perception data comprised in the request message; and
    determining the target scenario associated with the target perception data based on the scenario analysis.

11. The data processing method according to claim 10, wherein the target perception data is data generated at a location, and wherein performing the scenario analysis on the target perception data comprises performing the scenario analysis on the target perception data according to positioning information of the location.

12. The data processing method according to claim 8, wherein determining the target scenario associated with the target perception data according to the request message comprises determining the target scenario according to an identifier included in the request message that identifies the target scenario.

13. A data processing device, comprising:
a memory storing instructions; and
a processor coupled to the memory and configured to execute the instructions, which cause the processor to be configured to:
  obtain target perception data, wherein the target perception data comprises at least one of image data, video data, or a recording;
  determine a target scenario associated with the target perception data;
  determine a target perception model corresponding to the target scenario; and
  compute an object recognition result of the target perception data according to the target perception model.

14. The data processing device according to claim 13, wherein the instructions further cause the processor to be configured to:
  perform scenario analysis on the target perception data; and
  determine the target scenario based on the scenario analysis.

15. The data processing device according to claim 14, wherein the target perception data is data generated by a data generating terminal at a location, and wherein the instructions further cause the processor to be configured to perform scenario analysis on the target perception data according to positioning information of the location.

16. The data processing device according to claim 13, wherein the instructions further cause the processor to be configured to:
  send a first request for a scenario associated with the target perception data to a server; and
  receive the target scenario from the server.

17. The data processing device according to claim 13, wherein the instructions further cause the processor to be configured to determine the target perception model corresponding to the target scenario from a pre-stored perception model library, wherein each perception model in the pre-stored perception model library corresponds to a scenario.

18. The data processing device according to claim 17, wherein the instructions further cause the processor to be configured to update the pre-stored perception model library according to a historical scenario sequence of a user before the target perception data is obtained to obtain an updated perception model library, wherein the updated perception model library comprises the target perception model corresponding to the target scenario.

19. The data processing device according to claim 13, wherein the instructions further cause the processor to be configured to:
  send a second request for a perception model corresponding to the target scenario to a server when a pre-stored perception model library does not include the perception model corresponding to the target scenario, wherein each perception model in the pre-stored perception model library corresponds to a scenario; and
  receive the target perception model corresponding to the target scenario from the server.

20. A data processing device, comprising:
a memory storing instructions; and
a processor coupled to the memory and configured to execute the instructions, which cause the processor to be configured to:
  receive a request message for a perception model corresponding to a scenario associated with target perception data from a terminal, wherein the target perception data comprises at least one of image data, video data, or a recording;
  determine a target scenario associated with the target perception data according to the request message;
  determine, from a perception model library, the target perception model corresponding to the target scenario, wherein each model in the perception model library corresponds to a scenario; and
  send the target perception model to the terminal according to the request message to prompt the terminal to compute an object recognition result of the target perception data according to the target perception model.

21. The data processing device according to claim 20, wherein the instructions further cause the processor to be configured to:
  obtain a perception data sample before receiving the request message, wherein the perception data sample comprises at least a part of perception data having scenario annotation information and object annotation information;
  train perception models respectively corresponding to different scenarios according to the perception data sample; and
  store the perception models respectively corresponding to the different scenarios in the perception model library, wherein the perception model library comprises the target perception model.

22. The data processing device according to claim 20, wherein the instructions further cause the processor to be configured to:
  perform scenario analysis on the target perception data comprised in the request message; and
  determine the target scenario associated with the target perception data based on the scenario analysis.

23. The data processing device according to claim 22, wherein the target perception data is data generated by a data generating terminal at a location, and wherein the instructions further cause the processor to be configured to perform scenario analysis on the target perception data according to positioning information of the location.

24. The data processing device according to claim 20, wherein the instructions further cause the processor to be configured to determine the target scenario according to an identifier included in the request message and identifying the target scenario.

* * * * *

UNITED STATES PATENT AND TRADEMARK OFFICE
CERTIFICATE OF CORRECTION

| | | |
|---|---|---|
| PATENT NO. | : 11,093,806 B2 | Page 1 of 1 |
| APPLICATION NO. | : 16/586209 | |
| DATED | : August 17, 2021 | |
| INVENTOR(S) | : Liangwei Wang and Jia Chen | |

It is certified that error appears in the above-identified patent and that said Letters Patent is hereby corrected as shown below:

On the Title Page

Page 2, (56) References Cited, U.S. Patent Documents: "2012/0232993 A1 9/2012 Caiman" should read "2012/0232993 A1 9/2012 Calman"

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*